United States Patent [19]
Bieganski

[11] 3,816,915
[45] June 18, 1974

[54] STRIPPING TOOLS
[75] Inventor: Zdzislaw Bieganski, Harpenden, England
[73] Assignee: Halina Bieganski, Harpenden, England; a part interest
[22] Filed: Mar. 2, 1972
[21] Appl. No.: 231,118

[30] Foreign Application Priority Data
July 7, 1971    Great Britain.................... 31779/71

[52] U.S. Cl. .............................................. 30/90.1
[51] Int. Cl............................................. H02g 1/12
[58] Field of Search............ 81/9.5 R, 9.51; 30/90.1

[56] References Cited
UNITED STATES PATENTS
2,239,755    4/1941    Montgomery....................... 81/9.51
2,401,149    5/1946    Gordon............................... 81/9.51
3,630,105    12/1971   Rider.................................. 81/9.51

FOREIGN PATENTS OR APPLICATIONS
521,433    5/1940    Great Britain..................... 81/9.5 R Primary Examiner—James L. Jones, Jr.
Assistant Examiner—Roscoe V. Parker
Attorney, Agent, or Firm—Marshall & Yeasting

[57]    ABSTRACT

A wire stripping tool has a rotatable head comprising cutting blades which are radially displaced to cut into the wire sheath via a pin and slot or co-operating wedges mechanism so that the displacing force is applied axially and converted to the radial direction by the mechanism. The described tool has a manually driven rotation means and is made as a pistol with two triggers: one for rotation and the other for blade displacement.

6 Claims, 7 Drawing Figures

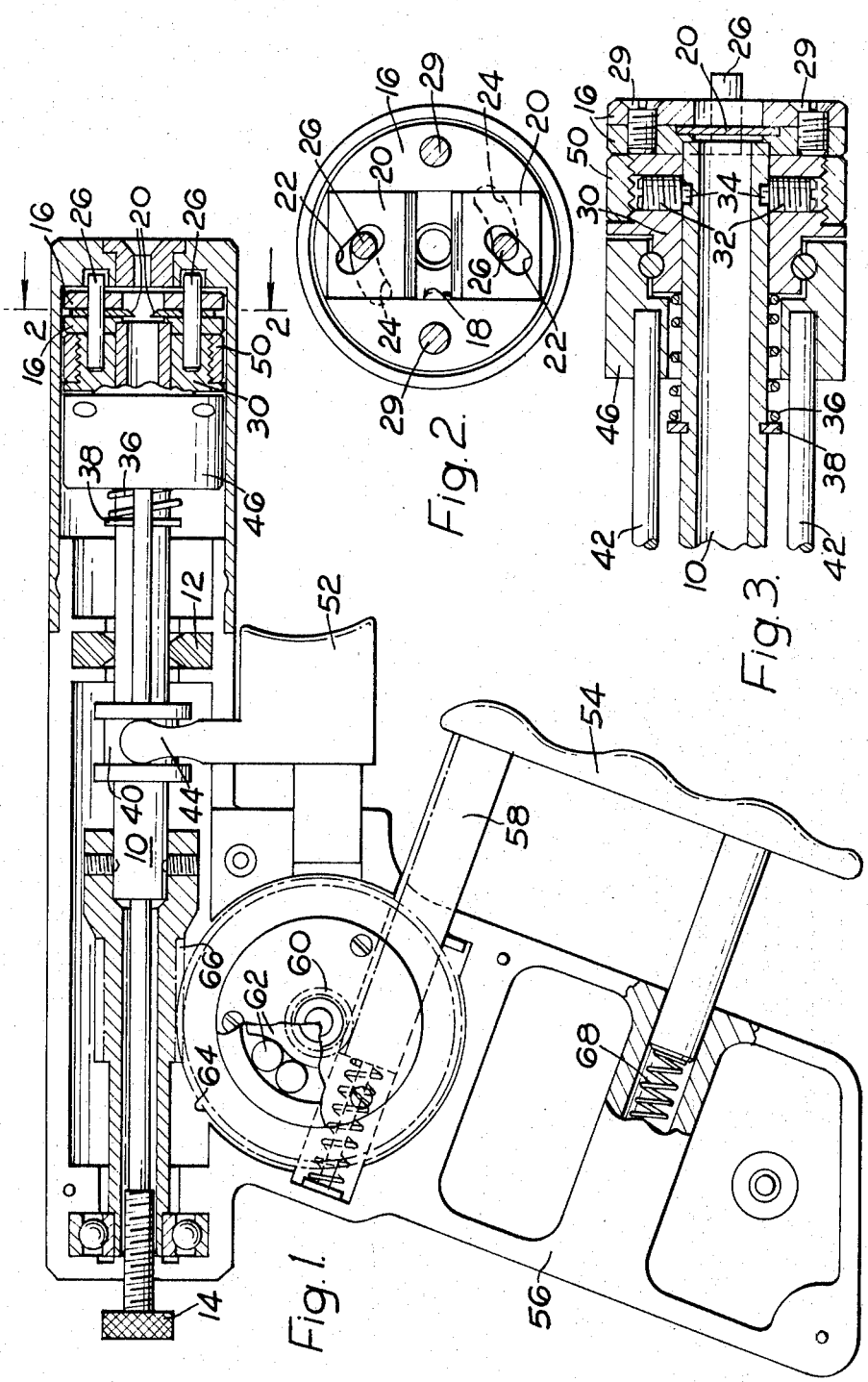

STRIPPING TOOLS

This invention relates to tools for stripping the sheath or covering from a wire or cable. For this purpose it is necessary to make a cut into the sheath and then displace the sheath along the core of the wire or like, and the cut may be wholly through the sheath or only partway through in which latter event the displacement tears the sheath. The displacement may be such as to remove a portion of sheath wholly from the core, or such as to bare the core over a portion of its length only.

Many tools are known for such purposes and one particularly efficient form of such tool is arranged so that a plurality of blades are closed towards the sheath and rotated about the sheath, and a displacement of the cable whilst the blades are engaged causes the sheath displacement and stripping. The object of the invention is to provide an improved and simplified tool of this kind.

In accordance with the invention, a wire stripping tool comprises a number of blades movable inwardly and outwardly with respect to the rotational axis of a head carrying the blades, a cursor mounted for rotation with the head and also adapted for displacement relative to the head, and means coupling the cursor and blades whereby the latter are moved relative to said axis inwardly or outwardly when the cursor moves relative to the head.

The cursor may be movable axially and coupled by cam surfaces to cause the blade movement inwardly and outwardly of the axis of rotation, or by pin and slot means to the same end.

The invention is now more particularly described with reference to the accompanying drawings, wherein:

FIG. 1 is a part-sectional elevation of a first embodiment;

FIG. 2 is a transverse e section taken on the line 2—2 of FIG. 1.

FIG. 3 is a fragmentary sectional planof part of the tool shown in FIGS. 1 and 2 and on an enlarged scale;

Figure 4:
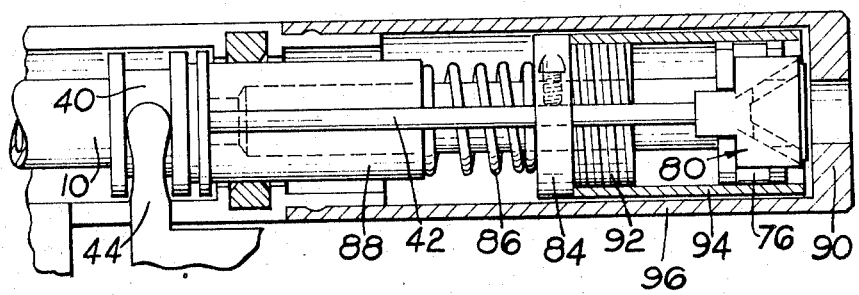
FIG. 4 is a fragmentary sectional elevation view similar to FIG. 1, but showing a modification.

Referring now to the drawings and particularly to the embodiments shown in FIGS. 1 to 3 thereof, a tube 10 is provided, and mounted for rotation in suitable journals 12, and accommodates the wire or cable in its bore; a screw-adjusted stop 14 projects into the bore and may control the length of cable which can be inserted and hence the cutting point and length of sheath to be stripped. The tube carries at one end (at which the cable is inserted) a head, fast with the tube, and formed of two annuli 16 with a diametric slot 18 formed therebetween. The slot accommodates a pair of cutting blades 20 which can meet at a line diametric to the rotational axis of the tube and transverse to the slot. Each blade has an elongated slot 21 inclined so that the major axes of the blade slots when extended meet at an extension of the line containing the met edges of the blades. The annuli have part concentric slots 24 therethrough to accommodate a pair of driving pins 26, each passing through one of the blade slots and the two are held together by screws 29.

The cursor comprises a bush 30 which is rotatable on the tube and carries the driving pins 26; due to the geometrical relationship of the slots, rotation of the bush relative to the tube moves the pins 26 in a concentric path which is generally transverse to the diametric slot but in opposite directions at the respective ends of that blade accommodating diametric slot, and the blades are constrained to move, as the pins drive the blades via the blade slots, towards one another or away from one another.

The cursor carries two diametrically directed pins 32 which engage in helical slots 34 in the tube, these being of like hand but oppositely located, so that no axial movement of the cursor derives a relative rotation of the cursor, for the blade moving purpose. A spring 36 lies between the cursor and an abutment 38 to drive the cursor to the extreme position in which the blades are separated by a maximum distance. A screw is adjustable to project towards the cursor to limit the movement of the same and control the separation of the blades at the minimum opening therebetween.

The cursor also comprises a collar 40 connected thereto by tie rods 42 and having a peripheral groove engaged by a fork 44 connected to a lever device, for causing the axial displacement whilst the cursor is rotating with the tube. As shown the bush 30 is connected to the tie rods via a cursor part 46 which may include a rotatable joint therebetween.

In use, the tube is rotated, and the cable inserted into the bore up to the stop; the cursor is lever displaced, and the blades cut into the sheath. The cable is then pulled part-way out of the tube and the cursor is spring-returned, and this allows the cable with part-displaced sheath to be completely removed. However, if complete stripping is desired, the tube may have a side aperture, so that the sheath portion which is stripped off will be displaced out of the tube during a subsequent operation.

More than two blades may be provided, in which the event the cursor will have more than two driving pins; the cursor need only be coupled to the tube by a single pin. The tube may be rotated by any desired motor or means.

The invention allows a single head to operate efficiently on cables of a wide range of sizes, and of a wide range of ratios of core; sheath thickness, and a wide variety of sheath hardnesses. Because the blades are located close to the point of entry of the cable, the latter can be held close to the blades (in complete safety) thus avoiding risk of the cable twisting between the point at which it is gripped and the point at which it is cut.

In the arrangement shown the blades may be regarded as spring-loaded to the separated position, and lever displaced to the closed position: the reverse possibility also exists. Cursor movement and hence blade movement may be limited by adjustment screws, for example the screwed collar 50 may be extended to limit travel of the cursor to the right as in FIG. 1.

The invention may be incorporated in a hand-held tool which is manually powered as illustrated. Such tool is pistol shaped with two triggers, a first of which 52 displaces the cursor and the second of which 54 is adapted to be moved repeatedly towards the butt 56 of the pistol to rotate the tube. The tube lies along the line of the "barrel" of the pistol. The drive mechanism then includes a rack 58 which is driven by the second trigger, a pinion 60 rotated by the rack, a one-way clutch 62 between the pinion and a drive wheel 64, and a worm 66 on the tube and meshed with the wheel. The one-way clutch may comprise a multi-legged rotor fast with the pinion and having unequal cam faces between each two legs, and rollers trapped, one between each two legs, the rotor being located in a chamber in the drive wheel. In one direction of rotation of the rotor the rollers wedge the legs to the drive wheel to transmit torque, and when the pinion is reversed, by spring 68 return of the rack and second trigger, the rollers free to allow the rotor to turn relative to the drive of the wheel. Hence, in such tool the cable is inserted, and the two triggers move towards the butt; the second trigger may be reciprocated by the second, third and fourth fingers of one hand, whilst light pressure is applied to the first finger of that hand to the first trigger. When the first trigger is moved to the fullest extent possible, that is the cursor reaches the stop, the cable can be pulled out as before.

Alternatively the invention may be embodied in for example a bench mounted electric motor driven tool, provided with a plurality of heads, each of different tube bore so as to be capable of rapid stripping of multi-sheath cables to predetermined requirements; this may be very convenient for co-axial cables.

Referring now to the arrangements shown in FIGS. 4–7 of the drawings, the tube 10 is arranged to be axially displaced by lever 44 engaging cursor part 40 connected by tie rods 42 to a blade displacing mechanism in generally similar fashion to that illustrated in FIGS. 1–3. In this modification however, the blades (not shown) are located in recesses 70 in blocks 72 each of which have a T-slot 74 so as to engage upon a drive block 76 provided at the end of the tube. Blocks 72 are thus slidable radially of the tube and carry the blades in such movement.

Each of the blocks has upon each lateral face a cam which, in the form illustrated, comprises an inclined plane 78 and the duplicated sets of inclined planes meet to form a pair of T's, one on each side of the tube.

Figures 5, 6:
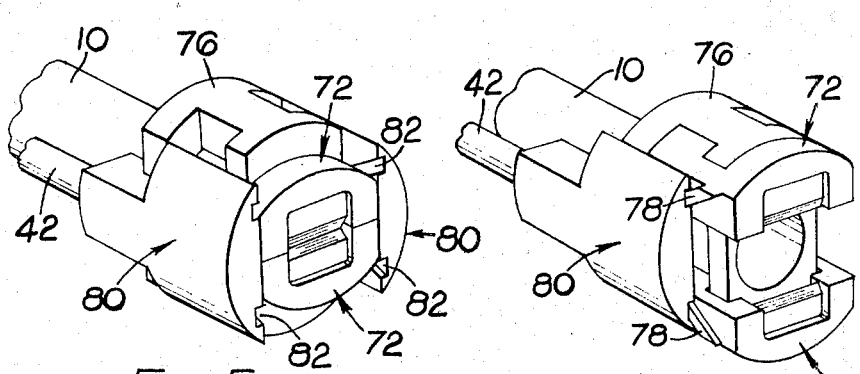
FIGS. 5 and 6 show portions of the arrangement of FIG. 4 in different positions.

Directly coupled to the tie rods 42 are cursor parts 80 having complementary cam faces and hence in the form of V-grooves 82. Each part 80 embraces the two blocks 72 and it will be seen that axial movement of the parts 80 results in inward or outward movement of the blocks 72 and hence of the blades. FIG. 5 shows the parts 80 in an extreme position in which the blades are closed together, and FIG. 6 shows the reverse arrangement in which the blades are a maximum distance apart.

The tie rods 42 are captive with an abutment block 84 and a spring 86 extends between a shoulder 88 axially fast with the tube and the abutment 84, the arrangement in this instance being such as to urge the blades towards one another. This enables the blades to be separated by a lever movement and spring-returned to close the blades towards one another. It will be appreciated that blade closing movement limiting means may be provided in the form of an adjustment screw extending through the end face 90 and acting directly on one of the parts 80. Hence in use, the blades may be opened a maximum amount and then allowed to close under the influence of the spring until they reach the predetermined minimum separation whereupon the stripping operation can be completed.

Figure 7:
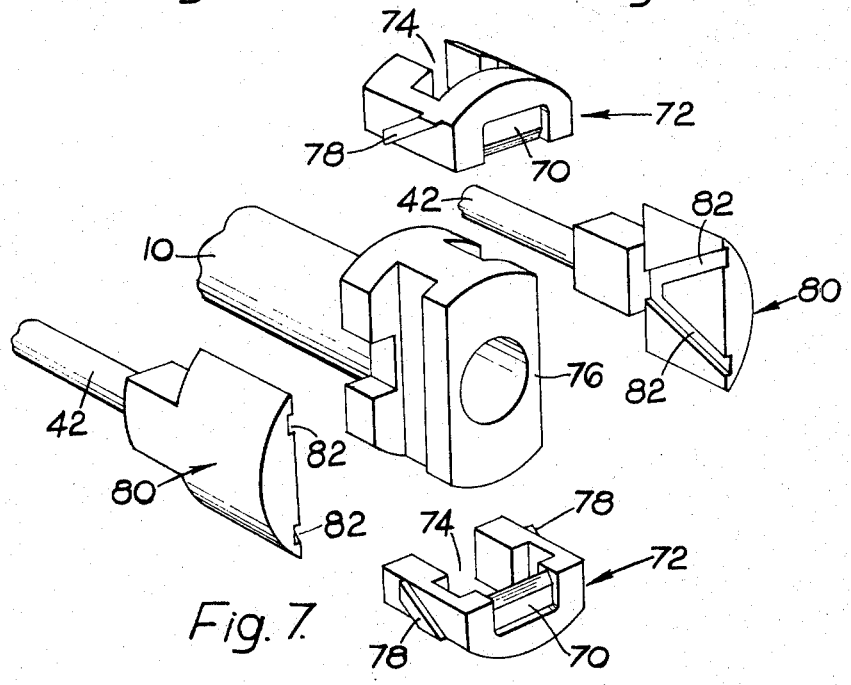
FIG. 7 is an exploded perspective view of the parts shown in FIGS. 5 and 6.

For convenience in assembly, the part 84 may be made integral with a screw threaded collar 92 engaging a sleeve 94 which encases the parts generally illustrated in FIGS. 5–7, protecting them from ingress of dirt and also possibly acting as a journal within the barrel casing 96. The arrangement of FIGS. 4–7 is preferred over that of FIGS. 1–3 for simplicity in manufacture, particularly since many of the parts can be made as plastics mouldings, with the exception of the cutting blades per se, and may be incorporated in a manually rotated tool such as in FIG. 1, or in other manually or power-driven hand operated or bench tools, to suit requirements.

I claim:

1. A wire stripping tool comprising a number of blades movable inwardly and outwardly with respect to the rotational axis of a head carrying the blades, a cursor mounted for rotation with the head and also adapted for displacement relative to the head, means coupling the cursor and blades whereby the latter are moved relative to said axis inwardly or outwardly when the cursor moves relative to the head, and a tube for receiving the wire to be stripped, the head being fast with the tube, the blades each being mounted on parts slidable on the head in a direction radial to the tube and being rotationally fast with the head, each of the said parts carrying the blades being provided with a cam surface, and the cursor including a part displaceable axially with respect to the head and having a complementary surface engaged with said cam surface.

2. A tool as claimed in claim 1 wherein two blade carrying parts are provided and the cam surfaces of the two are arranged in V-formation, the cursor part having its complementary cam surfaces likewise arranged in V-formation to engage with and displace both of the blade carrying parts simultaneously.

3. A tool as claimed in claim 2 wherein the cursor is spring loaded to urge the blades towards one another.

4. A tool as claimed in claim 1 including adjustment means for limiting the cutting stroke of the blades.

5. A tool as claimed in claim 1 wherein the head is connected to a manually operated mechanism for rotating the head.

6. A tool as claimed in claim 4 wherein the manually operated mechanism includes a reciprocable trigger and a drive train including a one-way clutch.

* * * * *